US012691769B2

(12) United States Patent
Wang et al.

(10) Patent No.: US 12,691,769 B2
(45) Date of Patent: Jul. 28, 2026

(54) VIRTUAL HIGH VOLTAGE INTERLOCK SYSTEM AND METHOD USING A DC-to-DC CONVERTER IN ELECTRIFIED VEHICLES

(71) Applicant: Rivian IP Holdings, LLC, Irvine, CA (US)

(72) Inventors: Baojin Wang, San Marcos, CA (US); Jing Hong, Trabuco Canyon, CA (US); Chen Yin, Irvine, CA (US); Kyle Lobo, Westchester, CA (US); Thomas Rocroi, Richmond, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 1019 days.

(21) Appl. No.: 17/863,163

(22) Filed: Jul. 12, 2022

(65) Prior Publication Data

US 2024/0017627 A1      Jan. 18, 2024

(51) Int. Cl.
| | |
|---|---|
| *B60L 53/00* | (2019.01) |
| *B60L 53/20* | (2019.01) |
| *H02J 7/34* | (2006.01) |
| *H02J 7/80* | (2026.01) |
| *H02J 7/96* | (2026.01) |

(52) U.S. Cl.
CPC .............. *B60L 53/00* (2019.02); *B60L 53/20* (2019.02); *H02J 7/342* (2020.01); *H02J 7/80* (2026.01); *H02J 7/96* (2026.01); *B60L 2210/10* (2013.01)

(58) Field of Classification Search
CPC ...................................................... B60L 53/00
USPC ......................................................... 320/108
See application file for complete search history.

(56) References Cited

U.S. PATENT DOCUMENTS

| | | | |
|---|---|---|---|
| 2016/0352120 A1* | 12/2016 | Lovett ..................... | B60L 53/20 |
| 2017/0229886 A1* | 8/2017 | Eaves ................... | H02J 7/0034 |
| 2017/0264122 A1* | 9/2017 | Greening ................. | H02J 7/00 |
| 2019/0304207 A1* | 10/2019 | Light-Holets .......... | G07C 5/008 |

* cited by examiner

*Primary Examiner* — Yalkew Fantu
(74) *Attorney, Agent, or Firm* — HG LAW LLP

(57) ABSTRACT

A virtual high voltage interlock is disclosed that utilizes a software-based function (e.g., an electronic control unit) to determine if there are any open wires or connectors, based on voltage signals reported by internal components, to prevent high voltage exposure. The electronic control unit instructs a power source to charge a DC bus to a safety voltage, receives measured voltage readings, via a control area network, from at least one high voltage component coupled to the DC bus, and provides an operating voltage to the DC bus in response to the measured voltage readings being acceptable.

20 Claims, 6 Drawing Sheets

200

400

500

600

VIRTUAL HIGH VOLTAGE INTERLOCK SYSTEM AND METHOD USING A DC-to-DC CONVERTER IN ELECTRIFIED VEHICLES

INTRODUCTION

The present disclosure relates to a virtual high voltage interlock safety mechanism that prevents high voltage exposure. In particular, the present disclosure relates to a virtual high voltage interlock that utilizes a software-based function to determine if there are any open wires or connectors based on voltage signals reported by internal high voltage components.

SUMMARY

A high voltage interlock (HVIL) is a safety mechanism that can be implemented in electric vehicles to protect against high voltage exposure. The high voltage interlock monitors high voltage connectors and components, so in the instance a direct current (DC) bus contains an open wire or connector, a discrepant voltage signal is reported, via, for example, a fault light, so that the open wire or connector can be fixed. For example, a vehicle battery pack, which charges up to 200 V or higher, may directly power a DC bus that couples to a variety of internal, high voltage components (e.g., a DC-to-DC converter, a charge controller, terminals, a manual service disconnect, or relays). A hardwire-based high voltage interlock uses a continuous, low-voltage loop that monitors high-voltage connectors and components to ensure there are no open connectors or other issues. If the signal is interrupted, the high voltage interlock reports this error, via, for example, a fault light, so that the issue can be inspected and resolved. A hardwire-based high voltage interlock adds complexity in electric vehicle design by adding wires and circuitry to protect against high voltage exposure. In addition, a hardwire-based (e.g., a controller area network (CAN)) high voltage interlock determines whether the DC bus contains an open wire or connector after the close of the main contactors (e.g., once the DC bus is charged to an operating voltage), resulting in high voltage exposure.

Systems and methods are described herein for a virtual high voltage interlock that utilizes a software-based function to prevent high voltage exposure by determining if any open wires or connectors exist based on voltage signals reported by internal components. In some embodiments, an electronic control unit (e.g., processing circuitry or battery monitoring system) provides a safety voltage to a DC bus. In some embodiments, the safety voltage is provided using a DC-to-DC converter coupled to a battery (e.g., a 12 V battery). In some embodiments, the DC-to-DC converter converts the battery voltage to the safety voltage (e.g., any suitable voltage 60 V or less). The DC-to-DC converter may deliver the safety voltage to the DC bus to charge the DC bus, which couples to any suitable number of high voltage components (e.g., a separate DC-to-DC converter, a charge controller, terminals, a manual service disconnect, or relays). The electronic control unit receives a measured voltage reading, via a control area network, from one or more of the high voltage components coupled to the DC bus. In some embodiments, the electronic control unit compares the measured voltage reading to at least one threshold voltage. It will be understood that the at least one threshold voltage may be any suitable voltage. In some embodiments, the electronic control unit may compare the measured voltage reading to a voltage range that includes the safety voltage. It will be understood that if the measured voltage reading is acceptable (e.g., the measured voltage reading exceeds either the at least one threshold voltage or is in the voltage range that includes the safety voltage due to there being no open wires or connectors in the DC bus), the electronic control unit causes an operating voltage to be provided to the DC bus. It will be understood that the electronic control unit may determine whether the DC bus includes an open wire or connector based on instructions recorded on a non-transitory computer-readable medium (e.g., random access memory (RAM)). In some embodiments, a vehicle battery pack provides the operating voltage (e.g., a battery pack voltage) to the DC bus, where the operating voltage may be any suitable voltage greater than the safety voltage. Concurrently or before, the electronic control unit may cease providing the safety voltage (e.g., by deactivating the DC-to-DC converter providing the safety voltage). It will be understood that the vehicle battery pack may be an electric vehicle battery pack. In some embodiments, the measured voltage reading may be unacceptable (e.g., the measured voltage reading is below the at least one threshold voltage or outside the voltage range that includes the safety voltage due to there being an open wire or connector in the DC bus), in which case the electronic control unit determines a fault condition exists and, accordingly, generates a fault report.

In some embodiments, the electronic control unit may receive a second measured voltage reading, via the control area network, from another one of the high voltage components coupled to the DC bus and proceed to compare the second measured voltage reading to the at least one threshold voltage. In some embodiments, the electronic control unit may compare the second measured voltage reading to the voltage range that includes the safety voltage. It will be understood that if the measured voltage reading and the second measured voltage reading are both acceptable (e.g., both the measured and the second measured voltage readings exceed the at least one threshold voltage or are in the voltage range that includes the safety voltage due to there being no open wires or connectors in the DC bus), the electronic control unit activates the vehicle battery pack to provide the operating voltage (e.g., the battery pack voltage) to the DC bus, where the operating voltage may be any suitable voltage greater than the safety voltage provided by the DC-to-DC converter. In some embodiments, concurrently or before, the electronic control unit may deactivate the DC-to-DC converter providing the safety voltage. In some embodiments, either the measured voltage reading or the second measured voltage reading may be unacceptable (e.g., either the measured voltage reading or the second measured voltage reading is below the at least one threshold voltage or outside the voltage range that includes the safety voltage due to there being an open wire or connector in the DC bus), in which case the electronic control unit determines a fault condition exists and, accordingly, generates a fault report.

BRIEF DESCRIPTION OF DRAWINGS

The above and other features of the present disclosure, its nature, and various advantages will be more apparent upon consideration of the following detailed description, taken in conjunction with the accompanying drawings in which.

DETAILED DESCRIPTION

In some embodiments, the present disclosure relates to a virtual high voltage interlock (HVIL) that utilizes a software-based function to prevent high voltage exposure by determining if any open wires or connectors exist based on voltage signals reported by internal components. In some embodiments, an electronic control unit (e.g., processing circuitry) provides a safety voltage to a DC bus. In some embodiments, the safety voltage is provided to the DC bus by a power source. In some embodiments, the power source may be a DC-to-DC converter coupled to a low voltage battery (e.g., a 12 V battery). In some embodiments, the DC-to-DC converter converts a low voltage, received from the low voltage battery, to the safety voltage (e.g., any suitable voltage 60 V or less). The DC-to-DC converter may deliver the safety voltage to the DC bus to charge the DC bus, which couples to any suitable number of high voltage components (e.g., a separate DC-to-DC converter, a charge controller, terminals, a manual service disconnect, or relays). The electronic control unit receives a respective measured voltage reading, via a control area network, from any one or more of the high voltage components coupled to the DC bus. In some embodiments, the electronic control unit compares the respective measured voltage reading to at least one threshold voltage. It will be understood that the at least one threshold voltage may be any suitable voltage. In some embodiments, the electronic control unit may compare the measured voltage reading to a voltage range that includes the safety voltage. It will be understood that if the measured voltage reading is acceptable (e.g., the measured voltage reading exceeds either the at least one threshold voltage or is in the voltage range that includes the safety voltage due to there being no open wires or connectors in the DC bus), the electronic control unit causes an operating voltage to be provided to the DC bus. In some embodiments, a vehicle battery pack provides the operating voltage (e.g., the battery pack voltage) to the DC bus, where the operating voltage may be any suitable voltage greater than the safety voltage. Concurrently or before, the electronic control unit may cease providing the safety voltage (e.g., by deactivating the DC-to-DC converter providing the safety voltage). It will be understood that the vehicle battery pack may be an electric vehicle battery pack, where the electric vehicle battery pack provides the operating voltage to the DC bus. In some embodiments, the measured voltage reading may be unacceptable (e.g., the measured voltage reading is below the at least one threshold voltage or outside the voltage range that includes the safety voltage due to there being an open wire or connector in the DC bus), in which case the electronic control unit determines a fault condition exists and, accordingly, generates a fault report.

Figure 1:
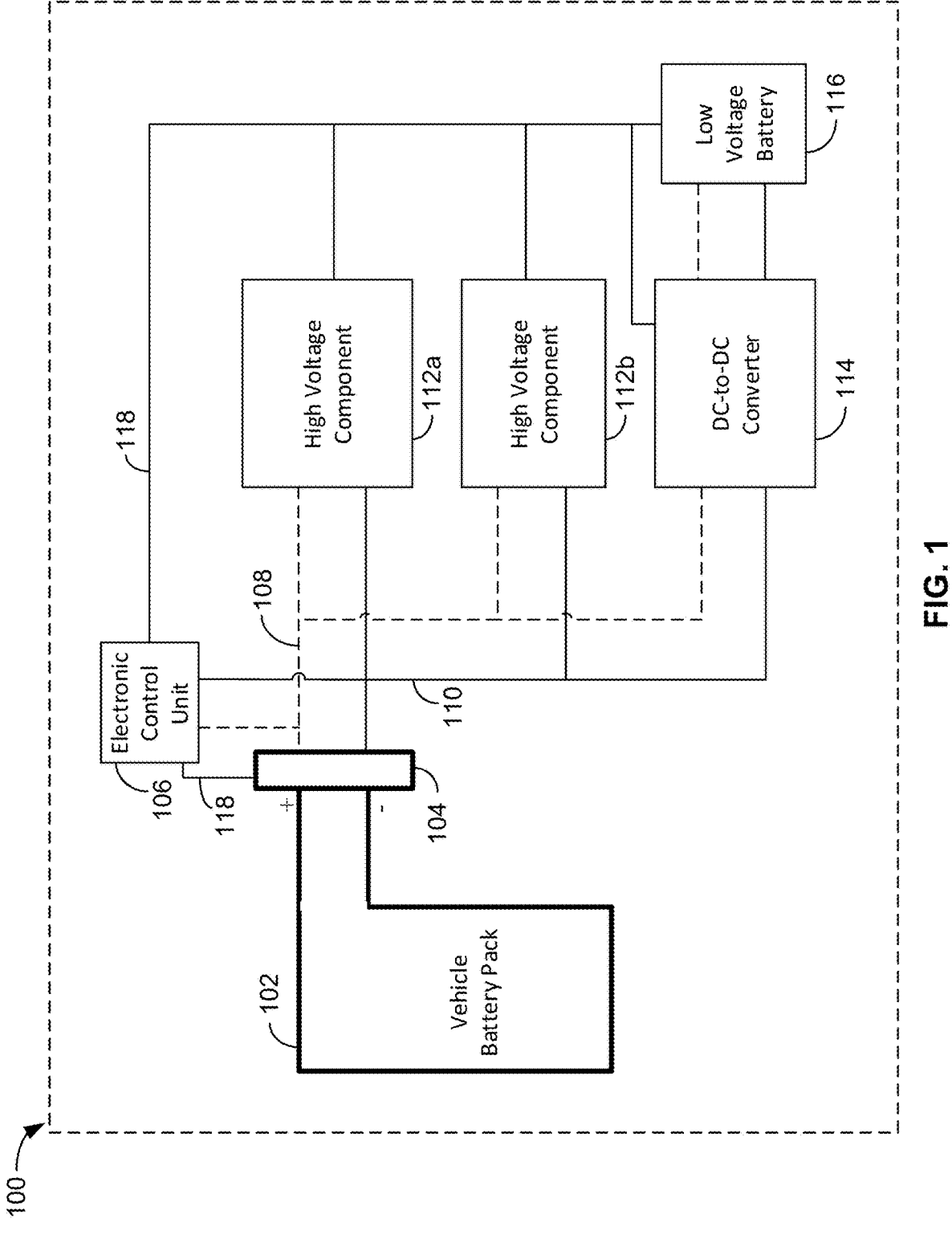
FIG. 1 shows an illustrative virtual high voltage interlock, in accordance with some embodiments of the present disclosure.

FIG. 1 shows an illustrative virtual high voltage interlock 100, in accordance with some embodiments of the present disclosure. Virtual high voltage interlock 100 includes a vehicle battery pack 102, a main contactor 104, an electronic control unit (ECU) 106, a high voltage DC bus 108, a ground 110, high voltage components 112a, 112b, a DC-to-DC converter 114, a low voltage battery 116, and a control area network 118. Although particular components are shown in FIG. 1, it will be understood that FIG. 1 is an exemplary depiction of the virtual high voltage interlock 100 and modifications may be made to its configuration. For example, it will be understood that any suitable number of high voltage components 112a, 112b and DC-to-DC converters 114 may be coupled to DC bus 108 and ground 110. In some embodiments, any suitable vehicle battery pack 102 may be used in the virtual high voltage interlock 100. In some embodiments, fuses may be coupled in series with the main contactor(s) 104, in the event the main contactor 104 is welded shut due to high arc flash, improper pre-charge, or any other reason, in order to protect internal components from a current surge. It will be understood that virtual high voltage interlock 100 may comprise any suitable number of main contactors 104, where main contactors 104 couple to a positive terminal, a negative terminal, or both positive and negative terminals of the vehicle battery pack 102.

Vehicle battery pack 102 couples to the main contactor 104 and delivers an operating voltage (e.g., a battery pack voltage) to the DC bus 108 via main contactor 104. In some embodiments, vehicle battery pack 102 includes one or more battery modules that provide DC power for the vehicle battery pack 102. In some embodiments, the operating voltage (e.g., 400 V, or higher, depending on system design) may be any suitable voltage greater than a safety voltage delivered by DC-to-DC converter 114 to DC bus 108. The vehicle battery pack 102 provides the operating voltage (e.g., the battery pack voltage), greater than the safety voltage, to charge the DC bus 108, via main contactor 104, once the electronic control unit 106 determines the DC bus 108 contains no open wires or connectors (e.g., in response to determining that no fault condition exists). In some embodiments, electronic control unit 106 may determine whether DC bus 108 includes an open wire or connector based on instructions recorded on a non-transitory computer-readable medium (e.g., RAM). Main contactor 104 receives DC power (e.g., 400 V) from vehicle battery pack 102 and delivers the DC power to DC bus 108. In some embodiments, main contactor 104 may include an auxiliary contactor in parallel to the main contactor 104 in the instance the main contactor 104 is welded shut by too high an arc flash, resulting in high temperature, across the main contactor 104. Electronic control unit (ECU) 106 (e.g., processing circuitry) couples to high voltage components 112a, 112b, DC-to-DC converter 114, and main contactor 104 via DC bus 108 and ground 110. Electronic control unit 106 communicates with high voltage components 112a, 112b, DC-to-DC converter 114, and main contactor 104 via control area network 118 (e.g., an Ethernet or any other vehicle communication link).

In order to activate virtual high voltage interlock (HVIL) 100, electronic control unit 106 activates DC-to-DC converter 114 to charge DC bus 108 (e.g., a DC rail) to a safety voltage. In some embodiments, the low voltage battery 116 (e.g., a 12 V battery) charges DC-to-DC converter 114 to a low voltage, where the DC-to-DC converter 114 converts the low voltage received from the low voltage battery 116 to the safety voltage (e.g., any suitable voltage 60 V or less). It will be understood that DC-to-DC converter 114 may provide a safety voltage to DC bus 108, where DC-to-DC converter 114 may step up a low voltage, received via low voltage battery 116, to the safety voltage to be provided to DC bus 108. In some embodiments, the safety voltage is provided to DC bus 108 via a power source. In some embodiments, the power source may be the DC-to-DC converter 114 coupled to the low voltage battery 116 (e.g., a 12 V battery). It will be understood that low voltage battery 116 may be any suitable low voltage battery. DC-to-DC converter 114 delivers the safety voltage to DC bus 108 to charge the DC bus 108, which couples to high voltage components 112a, 112b. In some embodiments, high voltage components 112a, 112b may include any suitable high voltage components (e.g., a separate DC-to-DC converter, a charge controller, terminals, a manual service disconnect, or relays). In some embodiments, virtual high voltage interlock 100 may include any suitable number of high voltage components 112a, 112b. In some embodiments, DC-to-DC converter 114 is a bidirectional DC-to-DC converter. For example, during the virtual high voltage interlock 100 testing, DC-to-DC converter 114 provides a safety voltage to DC bus 108 relying on low voltage battery 116 for power. Once the virtual high voltage interlock 100 testing passes and main contactor 104 is closed, DC bus 108 is charged to the vehicle operating voltage (e.g., the battery pack voltage). DC-to-DC converter 114 can then provide voltage to one or more other components (not shown) relying on vehicle battery pack 102 for power.

Electronic control unit 106 receives a measured voltage reading, via the control area network, from any one of the high voltage components 112a, 112b coupled to DC bus 108. It will be understood that any suitable communication protocol (e.g., Ethernet or any other vehicle communication link) may be used in virtual high voltage interlock 100. In some embodiments, high voltage components 112a, 112b may periodically report their respective input voltages, via control area network 118, to electronic control unit 106 in response to DC bus 108 being charged to the safety voltage (e.g., provided by the power source). In some embodiments, at a system level, high voltage components 112a, 112b may be instructed to provide their respective voltage measurements to electronic control unit 106 in response to DC bus 108 being charged to the safety voltage (e.g., provided by the power source). Electronic control unit 106 then proceeds to compare the measured voltage reading to at least one threshold voltage (e.g., any suitable threshold voltage). In some embodiments, electronic control unit 106 may compare the measured voltage reading to a voltage range that encompasses the safety voltage. It will be understood that if the measured voltage reading is acceptable (e.g., the measured voltage reading exceeds either the at least one threshold voltage or is in the voltage range that includes the safety voltage due to there being no open wires or connectors in the DC bus 108), the electronic control unit 106 activates the vehicle battery pack 102 to deliver the operating voltage (e.g., the battery pack voltage) to DC bus 108, via main contactor 104, where the operating voltage may be any suitable voltage greater than the safety voltage (e.g., greater than 60 volts) provided by the DC-to-DC converter 114. Concurrently or before, the electronic control unit 106 deactivates the DC-to-DC converter 114 (e.g., by deactivating low voltage battery 116). It will be understood that the vehicle battery pack 102 may be an electric vehicle battery pack, where the electric vehicle battery pack charges DC bus 108 to the operating voltage. In some embodiments, the measured voltage reading may be unacceptable (e.g., the measured voltage reading is below the at least one threshold voltage or outside the voltage range that encompasses the safety voltage due to there being an open wire or connector in the DC bus), in which case the electronic control unit 106 determines a fault condition (e.g., an open connector or an open wire condition) exists and, accordingly, generates a fault report.

In some embodiments, the electronic control unit 106 may receive a second measured voltage reading, via control area network 118, from a different one of the high voltage components 112a, 112b coupled to DC bus 108 and proceed to compare the second measured voltage reading to the at least one threshold voltage. In some embodiments, the electronic control unit 106 may compare the second measured voltage reading to the voltage range that includes the safety voltage. It will be understood that if the measured voltage reading and the second measured voltage reading are both acceptable (e.g., both the measured voltage reading and the second measured voltage reading exceed the at least one threshold voltage or are in the voltage range that includes the safety voltage due to there being no open wires or connectors in the DC bus), the electronic control unit 106 activates the vehicle battery pack 102 to provide the operating voltage (e.g., the battery pack voltage) to DC bus 108, via main contactor 104, where the operating voltage may be any suitable voltage greater than the safety voltage (e.g., greater than 60 volts) provided by the DC-to-DC converter 114. Concurrently or before, the electronic control unit 106 may deactivate DC-to-DC converter 114 (e.g., by deactivating the low voltage battery 116). In some embodiments, either the measured voltage reading or the second measured voltage reading may be unacceptable (e.g., either the measured voltage reading or second measured voltage reading is below the at least one threshold voltage or outside the voltage range that includes the safety voltage due to there being an open wire or connector in the DC bus), in which case the electronic control unit 106 determines a fault condition exists and, accordingly, generates a fault report. It will be understood that electronic control unit 106 may receive more than two measured voltage readings, via control area network 118, from the high voltage components (e.g., high voltage components 112a, 112b, etc.) and check that each of the measured voltage readings is acceptable as part of performing the virtual high voltage interlock 100.

DC bus 108 (e.g., the DC rail) receives the safety voltage, via DC-to-DC converter 114, from low voltage battery 116 and, in the instance the electronic control unit 106 determines the measured voltage reading is acceptable, receives the operating voltage (e.g., the battery pack voltage), via main contactor 104, from the voltage battery pack 102. It will be understood that when DC bus 108 receives the safety voltage (e.g., any suitable voltage such as 60 V or less), the DC bus 108 is charged to the safety voltage before electronic control unit 106 receives the measured voltage reading, via control area network 118, from one or more of the high voltage components 112a, 112b coupled to DC bus 108. It will be understood that when DC bus 108 receives the operating voltage (e.g., the battery pack voltage), via main contactor 104, the DC bus 108 is charged to the operating voltage (e.g., 400 V).

Figure 2:
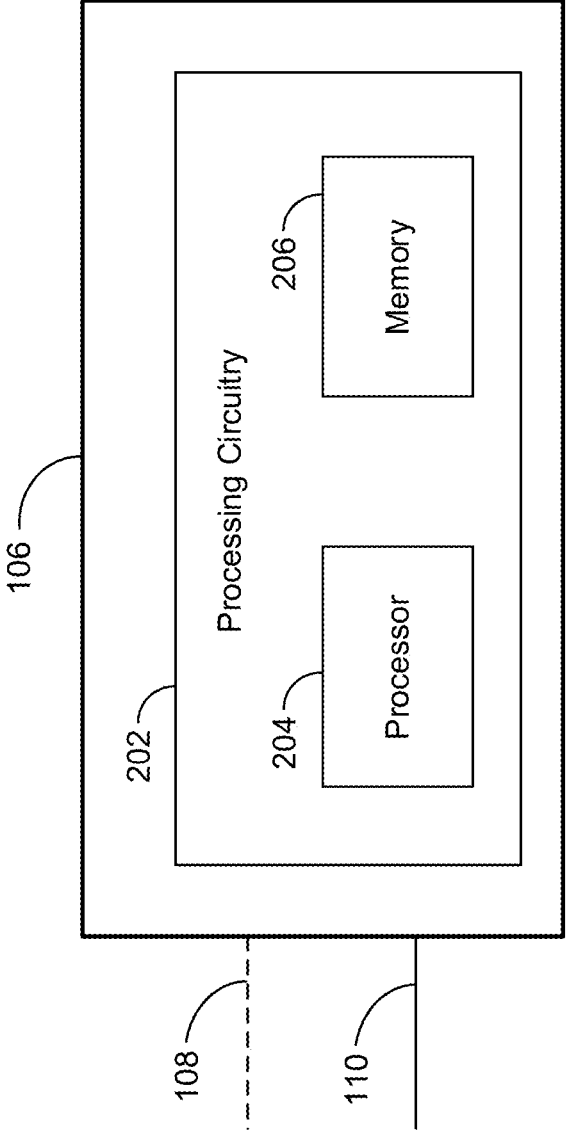
FIG. 2 shows an illustrative electronic control unit, in accordance with some embodiments of the present disclosure.

FIG. 2 shows an illustrative electronic control unit 106, in accordance with some embodiments of the present disclosure. The electronic control unit 106 includes processing circuitry 202, a processor 204, a memory 206, DC bus 108, and ground 110. Although particular components are shown in FIG. 2, it will be understood that FIG. 2 is an exemplary depiction of the electronic control unit and modifications may be made to its configuration.

Electronic control unit 106 may include processing circuitry 202, which may include processor 204 and memory 206. Processor 204 may include a hardware processor, a software processor (e.g., a processor emulated using a virtual machine), or any combination thereof. In some embodiments, processor 204 and memory 206 in combination may be referred to as processing circuitry 202 of electronic control unit 106. In some embodiments, processor 204 alone may be referred to as processing circuitry 202 of electronic control unit 106. Memory 206 may include hardware elements for non-transitory storage of commands or instructions, that, when executed by processor 204, cause processor 204 to operate electronic control unit 106 in accordance with embodiments disclosed herein. For example, memory 206 may store instructions relating to a measured voltage reading at one of the high voltage components 112a, 112b, where it will be understood that if the measured voltage reading exceeds either at least one threshold voltage or is in a voltage range that includes a safety voltage due to there being no open wires or connectors in the DC bus, the electronic control unit 106 activates a vehicle battery pack to deliver an operating voltage (e.g., a battery pack voltage) to the DC bus. Concurrently or before, the electronic control unit 106 may deactivate the safety voltage source such as DC-to-DC converter 114. In some embodiments, memory 206 may store instructions where it will be understood that if the measured voltage reading is below the at least one threshold voltage or is outside the voltage range that includes the safety voltage due to there being an open wire or connector in the DC bus, the electronic control unit 106 determines a fault condition exists and, accordingly, generates a fault report. In some embodiments, memory 206 may store instructions relating to the measured voltage reading at a first high voltage component and a second measured voltage reading at a second high voltage component, where it will be understood that if both measured voltage readings exceed either the at least one threshold voltage or are in the voltage range that includes the safety voltage due to their being no open wires or connectors in the DC bus, the electronic control unit 106 activates the vehicle battery pack to deliver the operating voltage (e.g., the battery pack voltage) to the DC bus. Concurrently or before, the electronic control unit 106 deactivates the safety voltage source such as DC-to-DC converter 114. In some embodiments, memory 206 may store instructions where it will be understood that if either of the measured voltage readings is below the at least one threshold voltage or outside the voltage range that includes the safety voltage due to there being an open wire or connector in the DC bus, the electronic control unit 106 determines a fault condition exists and, accordingly, generates a fault report.

Processing circuitry 202 may be communicatively coupled to components of the virtual high voltage interlock 100 via one or more wires (e.g., control area network 118 of FIG. 1), or via wireless connection. Memory 206 may be a memory module configured to store a digital signature and/or an identifier associated with the virtual high voltage interlock 100. Processing circuitry 202 may be communicatively coupled to an input interface (e.g., a touch screen display, buttons, knobs, etc.) via an input circuitry. In some embodiments, a service team may be permitted to select certain settings in connection with the operation of the electronic control unit 106 via the input interface. Processing circuitry 202 may be communicatively coupled to communications circuitry. Communications circuitry may include a wireless network transceiver, which may include any suitable hardware and/or software operable to send and receive wireless signals between electronic control unit 106 and external devices such as, for example, network or user devices and/or any other suitable computing devices. The wireless network transceiver may include an antenna and other control circuitry (e.g., protocol converters, rate converters, or signal converters), or any combination thereof. The wireless network transceiver may include one or more components to facilitate communication over any suitable network or communication method (e.g., the Internet, short-range radio communication such as, for example, Bluetooth, BLE, NFC, etc.). For example, the wireless network transceiver may be configured to access the Internet, a local area network, a wide area network, a Bluetooth-enabled device, a NFC-enabled device, any other suitable device using any suitable protocol, or any combination thereof. Processing circuitry 202 may be communicatively coupled to a battery system external to the virtual high voltage interlock 100, which may be configured to provide power to one or more of the components of the virtual high voltage interlock 100 during operation.

Figure 3:
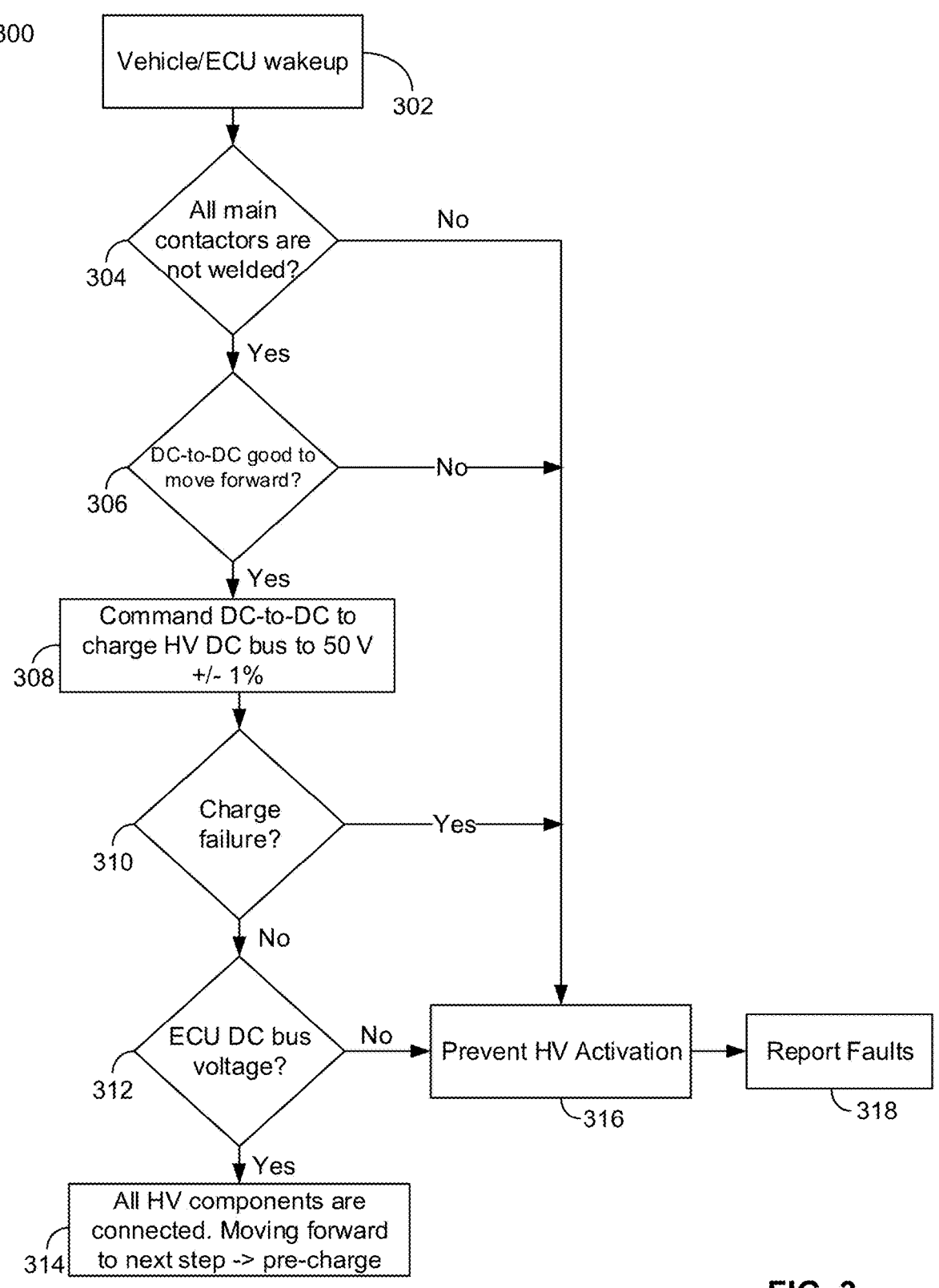
FIG. 3 shows a flowchart of illustrative steps for actuating a virtual high voltage interlock, in accordance with some embodiments of the present disclosure.

FIG. 3 shows a flowchart of illustrative steps for actuating a virtual high voltage interlock, in accordance with some embodiments of the present disclosure. The process 300 may be executed by the electronic control unit 106 (e.g., processing circuitry, control circuitry, or a battery monitoring system) located in the virtual high voltage interlock 100. It will be understood that process 300, and any step thereof, may be altered to any suitable configuration, including modifications to any of the steps themselves.

The process 300 begins at step 302, where the electric vehicle and/or electronic control unit 106 wakes up. At step 304, the electronic control unit 106 determines whether or not the main contactors are welded by, for example, a high arc flash, resulting in a high temperature across the main contactors. In some situations, at least one of the main contactors may be welded, in which case the electronic control unit 106 prevents high voltage activation 316. Accordingly, the electronic control unit 106 determines a fault condition exists and generates a fault report 318 to alert that at least one of the main contactors is welded. In some situations, none of the main contactors are welded, in which case process 300 proceeds to step 306, where the electronic control unit 106 determines whether the DC-to-DC converter (e.g., DC-to-DC converter 114) is good to move forward. In some embodiments, the DC-to-DC converter is not good to move forward, in which case the electronic control unit 106 prevents high voltage activation 316. For example, the DC-to-DC converter 114 may report an error (e.g., due to low voltage battery 116 being too weak to sufficiently power the DC-to-DC converter 114) to electronic control unit 106. Accordingly, the electronic control unit 106 determines a fault condition exists and generates a fault report 318 to alert the malfunction of the DC-to-DC converter. In some embodiments, the DC-to-DC converter is good to move forward, in which case process 300 proceeds to step 308, where the electronic control unit 106 actuates the DC-to-DC converter to deliver a safety voltage (e.g., 50 V+/−1%) to charge the DC bus (e.g., DC bus 108). At step 310, the electronic control unit 106 determines whether a charge failure has occurred at the DC bus. In some embodiments, the electronic control unit 106 may detect a charge failure, in which case the electronic control unit 106, determines a fault condition exists, prevents high voltage activation 316, and generates a fault report 318 alerting of the charge failure. In some embodiments, the DC-to-DC converter properly charges the DC bus to the safety voltage (e.g., 50 V+/−1%), in which case process 300 proceeds to step 312, where the electronic control unit 106 receives a measured voltage reading, via a control area network, from one of the high voltage components and determines whether the measured voltage reading is acceptable. In some situations, the electronic control unit 106 determines the measured voltage reading is acceptable (e.g., the measured voltage reading exceeds at least one threshold voltage or is in a voltage range that includes the safety voltage due to there being no open wires or connectors in the DC bus), in which case process 300 proceeds to step 314, where the electronic control unit 106 determines, based on the measured voltage reading being acceptable, that all high voltage components are connected. Accordingly, the electronic control unit 106 proceeds to the next step of pre-charging the DC bus (e.g., the electronic control unit 106 activates the vehicle battery pack to provide an operating voltage (e.g., a battery pack voltage) to charge the DC bus). In some embodiments, the electronic control unit 106 determines the measured voltage reading is unacceptable (e.g., the measured voltage reading is below the at least one threshold voltage or is outside the voltage range that includes the safety voltage due to there being an open wire or connector in the DC bus), in which case the electronic control unit 106 determines a fault condition exists, prevents high voltage activation 316, and generates a fault report 318 identifying at which high voltage component the discrepant measured voltage reading originates from. In some embodiments, step 312 includes the electronic control unit 106 receiving two or more measured voltage readings, via the control area network, (e.g., at respective high voltage components coupled to the DC bus) and determining whether all of the measured voltage readings are acceptable. In some embodiments, the electronic control unit 106 determines all of the measured voltages are acceptable (e.g., both a first measured voltage reading and a second measured voltage reading exceed the at least one threshold voltage or are in the voltage range that includes the safety voltage due to there being no open wires or connectors in the DC bus), in which case process 300 proceeds to step 314, where the electronic control unit 106 determines, based on the measured voltage readings being acceptable, that all high voltage components are connected. Accordingly, the electronic control unit 106 proceeds to the next step of pre-charging the DC bus (e.g., the electronic control unit 106 activates the vehicle battery pack to provide the operating voltage (e.g., the battery pack voltage) to charge the DC bus). In some embodiments, the electronic control unit 106 determines that at least one of the measured voltage readings is unacceptable (e.g., is below the at least one threshold voltage or is outside the voltage range that includes the safety voltage due to there being an open wire or connector in the DC bus), in which case the electronic control unit 106 determines a fault condition exists, prevents high voltage activation 316, and generates a fault report 318 identifying at which high voltage component the discrepant measured voltage reading originates from. In some embodiments, virtual high voltage interlock 100 may comprise more than one unacceptable measured voltage reading.

Figure 4:
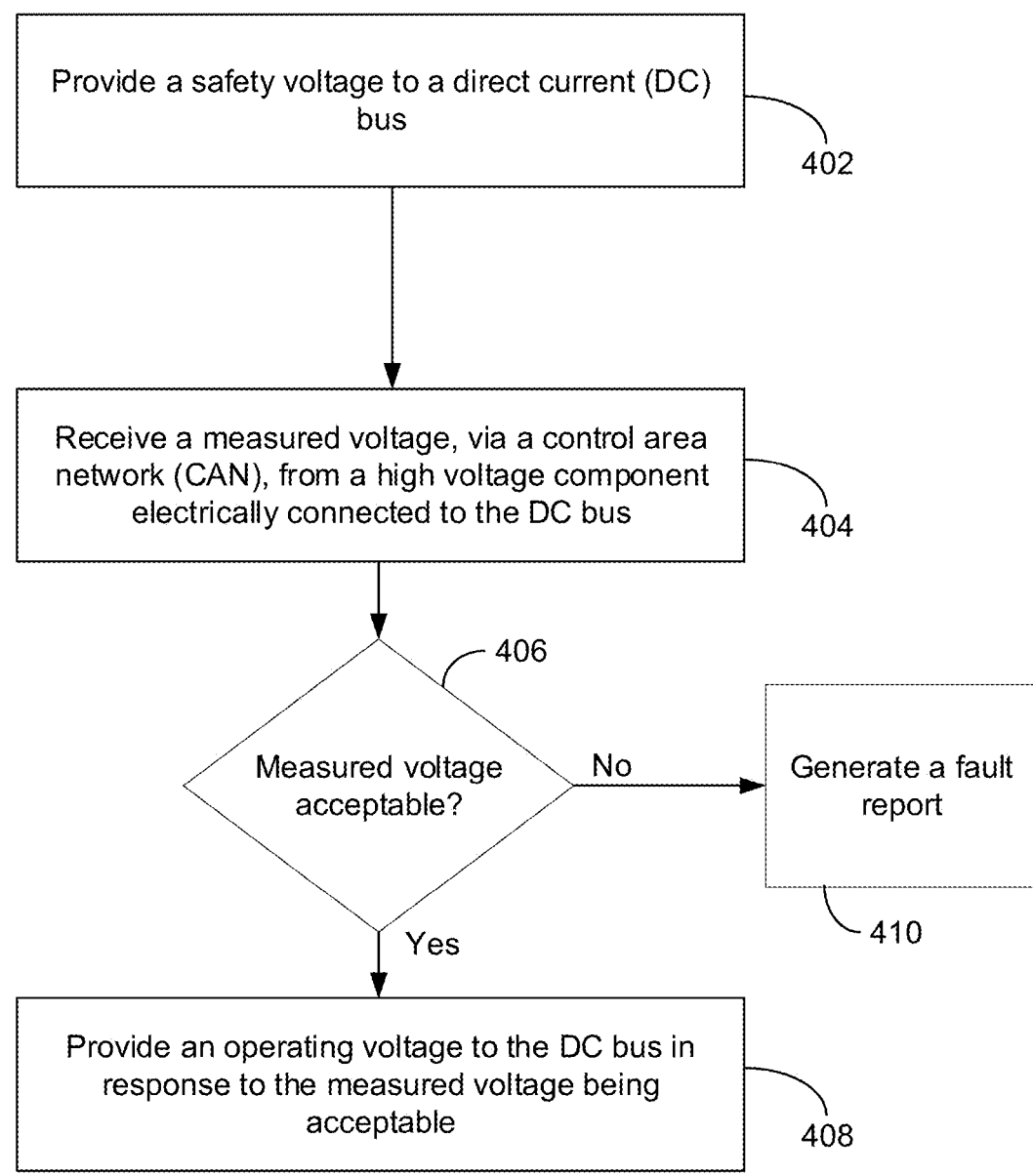
FIG. 4 shows a flowchart of illustrative steps for implementing a virtual high voltage interlock method, in accordance with some embodiments of the present disclosure.

FIG. 4 shows a flowchart of illustrative steps for implementing a virtual high voltage interlock method, in accordance with some embodiments of the present disclosure. The method 400 may be executed by the electronic control unit 106 (e.g., processing circuitry, control circuitry, or a battery monitoring system) located in the virtual high voltage interlock 100. It will be understood that method 400, and any step thereof, may be altered to any suitable configuration, including modifications to any of the steps themselves.

The method 400 begins at step 402, where the electronic control unit 106 provides a safety voltage to a DC bus (e.g., DC bus 108). In some embodiments, the safety voltage is provided by activating a DC-to-DC converter (e.g., DC-to-DC converter 114). In some embodiments, the electronic control unit 106 provides the safety voltage by activating (e.g., via a contactor) a low voltage battery (e.g., a 12 V battery) to deliver a low voltage directly to the DC bus. In some embodiments, the electronic control unit 106 provides the safety voltage by activating a low voltage battery (e.g., a 12 V battery) to deliver a low voltage to the DC-to-DC converter, which converts (e.g., steps up) the low voltage, received from the low voltage battery, to the safety voltage (e.g., any suitable voltage 60 V or less). The DC-to-DC converter provides the safety voltage to the DC bus to charge the DC bus, which couples to any suitable number of high voltage components (e.g., a separate DC-to-DC converter, a charge controller, terminals, a manual service disconnect, or relays).

The method 400 proceeds to step 404, where the electronic control unit 106 receives a measured voltage reading, via a control area network (CAN), from a high voltage component electrically connected to the DC bus. The electronic control unit 106 may receive the measured voltage reading, via the control area network, from any one of the high voltage components coupled to the DC bus and proceed to step 406, where the electronic control unit 106 determines if the measured voltage reading is acceptable by comparing the measured voltage reading to at least one threshold voltage. In some embodiments, the electronic control unit 106 may compare the measured voltage reading to a voltage range that includes the safety voltage. It will be understood that if the measured voltage reading is acceptable (e.g., the measured voltage reading either exceeds the at least one threshold voltage or is in the voltage range that encompasses the safety voltage due to there being no open wires or connectors in the DC bus), the process 400 proceeds to step 408, where the electronic control unit 106 activates a vehicle battery pack to provide an operating voltage (e.g., a battery pack voltage) to the DC bus, where the operating voltage may be any suitable voltage greater than the safety voltage provided by the DC-to-DC converter. Concurrently or before, the electronic control unit 106 may cease providing the safety voltage (e.g., by deactivating the low voltage battery or the DC-to-DC converter). In some embodiments, at step 406, the electronic control unit 106 may determine the measured voltage reading is unacceptable (e.g., the measured voltage reading is below the at least one threshold voltage or is outside the voltage range that includes the safety voltage due to there being an open wire or contactor in the DC bus), in which case the method 400 proceeds to step 410, where the electronic control unit 106 determines a fault condition exists and, accordingly, generates a fault report.

In some embodiments, at step 404, the electronic control unit 106 may receive a second measured voltage reading, via the control area network, from another one of the high voltage components coupled to the DC bus and proceed to step 406, where the electronic control unit 106 determines if the second measured voltage reading is acceptable by comparing the second measured voltage reading to the at least one threshold voltage. In some embodiments, the electronic control unit 106 may compare the second measured voltage reading to the voltage range that includes the safety voltage. It will be understood that if both the measured voltage readings are acceptable (e.g., the first and second measured voltage readings both exceed the at least one threshold voltage or both are in the voltage range that includes the safety voltage due to there being no open wires or connectors in the DC bus), the process 400 proceeds to step 408, where the electronic control unit 106 activates the vehicle battery pack to provide the operating voltage (e.g., the battery pack voltage) to the DC bus, in which case the operating voltage may be any suitable voltage greater than the safety voltage provided by the DC-to-DC converter. Concurrently or before, the electronic control unit 106 may cease providing the safety voltage. It will be understood that the electronic control unit 106 may receive more than two measured voltage readings, via the control area network, from any suitable number of high voltage components coupled to the DC bus. In some embodiments, at step 406, the electronic control unit 106 may determine that either the measured voltage reading or the second measured voltage reading is unacceptable (e.g., either the measured voltage reading or the second measured voltage reading is below the at least one threshold voltage or is outside the voltage range that includes the safety voltage due to there being an open wire or connector in the DC bus), in which case the method 400 proceeds to step 410, where the electronic control unit 106 determines a fault condition exists and, accordingly, generates a fault report.

Figure 5:
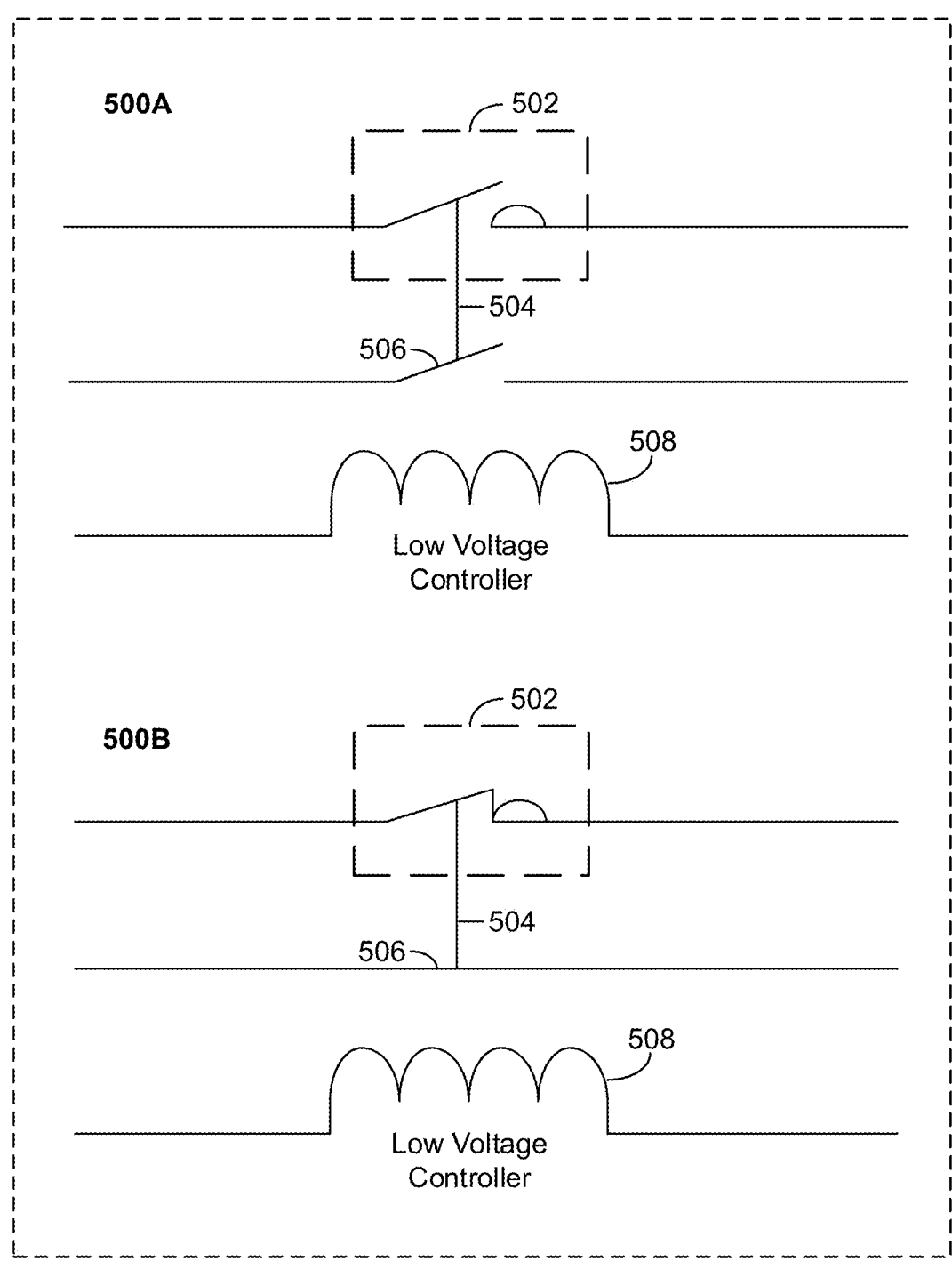
FIG. 5 shows a panel of two illustrative contactor arrangements, in accordance with some embodiments of the present disclosure.

FIG. 5 shows a panel 500 of two contactor arrangements, in accordance with some embodiments of the present disclosure. The contactor arrangements include a main contactor 502 and an auxiliary contactor 506. Arrangement 500A shows an illustrative open auxiliary contactor 506, and arrangement 500B shows an illustrative closed auxiliary contactor 506. The arrangements 500A and 500B show auxiliary contactor 506 mechanically coupled to a main contactor 502 (e.g., corresponding to the main contactor 104 of FIG. 1) via a connector 504. The connector 504 causes the auxiliary contactor 506 and main contactor 502 to have the same state. That is, if the main contactor 502 is open so is the auxiliary contactor 506, and if the main contactor 502 is closed so is the auxiliary contactor 506. The main contactor 502 couples a vehicle battery pack to a DC bus (e.g., DC bus 108) so that an operating voltage (e.g., a battery pack voltage) can be delivered to charge the DC bus, where the operating voltage may be any suitable voltage greater than a safety voltage delivered by, e.g., the DC-to-DC converter 114. In some embodiments, as depicted in arrangement 500A, main contactor 502 may be open if the DC bus is still being charged by the safety voltage received from the DC-to-DC converter. In some embodiments, main contactor 502 may be open if the electronic control unit 106 (e.g., processing circuitry, control circuitry, or a battery monitoring system) determines a measured voltage reading is unacceptable (e.g., the measured voltage reading is below at least one threshold voltage or is outside a voltage range that includes the safety voltage due to there being an open wire or contactor in the DC bus). In some embodiments, main contactor 502 may be open if the electronic control unit 106 determines either a first or a second measured voltage reading is unacceptable (e.g., either the first or second measured voltage reading is below the at least one threshold voltage or is outside the voltage range that includes the safety voltage due to there being an open wire or connector in the DC bus). Auxiliary contactor 506 and low voltage controller 508 may respectively couple to a low voltage battery (e.g., a 12-volt battery). In some embodiments, low voltage controller 508 may couple to a low voltage battery located in an electronic control unit (e.g., electronic control unit 106). In some embodiments, as depicted by arrangement 500B, main contactor 502 may be welded shut due to a high arc flash (e.g., an electric arc of light and heat produced as part of an electrical explosion or discharge between energized and exposed electrical conductors or circuit parts), resulting in a high temperature across the main contactor 502. When main contactor 502 is welded shut and low voltage controller 508 is activated (e.g., via electronic control unit 106) to open main contactor 502, main contactor 502 will remain closed, which in turn causes auxiliary contactor 506 to remain closed because of connector 504. Electronic control unit 106 can detect this fault condition by detecting whether the auxiliary contactor 506 circuit is open or closed. For example, the electronic control unit 106 may check for this fault condition as part of step 304 of FIG. 3 and report a fault when this fault condition is detected.

Figure 6:
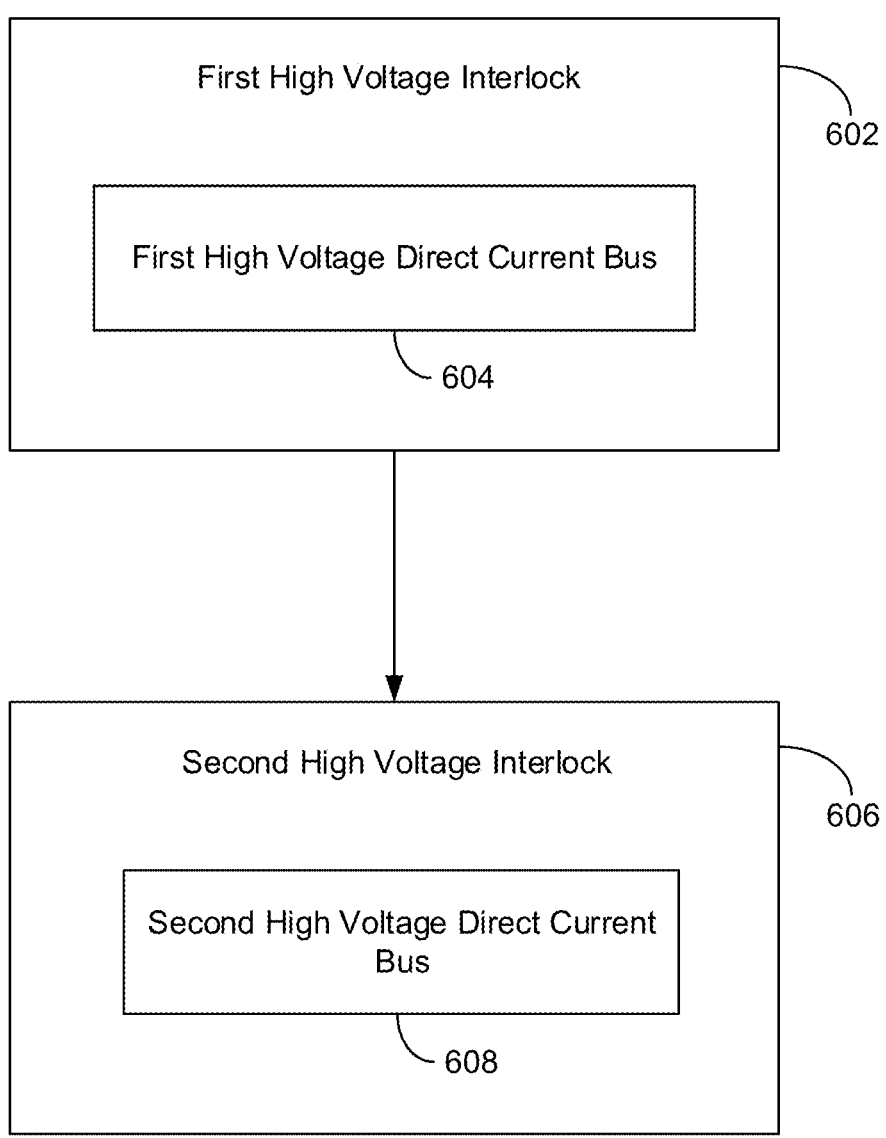
FIG. 6 shows an illustrative virtual high voltage interlock system, in accordance with some embodiments of the present disclosure.

FIG. 6 shows an illustrative virtual high voltage interlock system, in accordance with some embodiments of the present disclosure. System 600 includes a first virtual high voltage interlock 602 (corresponding to virtual high voltage interlock 100 of FIG. 1), which incorporates a first high voltage DC bus 604 (corresponding to high voltage DC bus 108 of FIG. 1), and a second virtual high voltage interlock (HVIL) 606, which incorporates a second high voltage DC bus 608. In some embodiments, the first high voltage DC bus 604 corresponds to a first high voltage DC bus of an electric vehicle (e.g., a 400 V bus) and the second high voltage DC bus 608 corresponds to a second high voltage DC bus of the electric vehicle (e.g., a 800 V bus). In some embodiments, the first virtual high voltage interlock 602 and the second virtual high voltage interlock 606 may determine if there are any open wires or connectors at the same time or sequentially. In some embodiments, a first ECU (e.g., processing circuitry, control circuitry, or a battery monitoring system) (corresponding to ECU 106 of FIG. 1) may execute instructions/commands for the first virtual high voltage interlock 602, while a second ECU (e.g., processing circuitry, control circuitry, or a battery monitoring system) may execute instructions/commands for the second virtual high voltage interlock 606. In some embodiments, the second ECU may determine whether the second DC bus 608 includes an open wire or connector based on instructions recorded on a non-transitory computer-readable medium (e.g., RAM). In some embodiments, the second ECU may determine whether the second DC bus 608 includes an open wire or connector by charging the second DC bus 608 to a second safety voltage via a second power source, instructing one or more second high voltage components to each report a second measured voltage reading to the second ECU, and determining whether a fault condition exists based on the respective second measured voltage readings received by the second ECU. In some embodiments, the second virtual high voltage interlock 606 may provide a second operating voltage (e.g., a second battery pack voltage), greater than the second safety voltage, to charge the second DC bus 608 once the second ECU determines that no fault condition (e.g., an open connector or open wire condition) exists. In some embodiments, a single ECU may execute instructions/commands for both the first virtual high voltage interlock 602 and the second virtual high voltage interlock 606. In some embodiments, the first virtual high voltage interlock 602 may electrically couple to the second virtual high voltage interlock 606. In some embodiments, communication circuitry (e.g., a point-to-point circuit, a two-wire circuit, a four-wire circuit, etc.) may couple between the first virtual high voltage interlock 602 and the second virtual high voltage interlock 606. In some embodiments, virtual high voltage interlock system 600 may include more than two virtual high voltage interlocks. In some embodiments, first virtual high voltage interlock 602 may wirelessly couple, e.g., via Bluetooth, RF, IR, or satellite, to second virtual high voltage interlock 606.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system, comprising:
a high voltage direct current (DC) bus; and
a virtual high voltage interlock (HVIL), comprising:
    a non-transitory computer-readable medium having instructions recorded thereon that, when executed by an electronic control unit (ECU), cause the ECU to:
        charge the high voltage DC bus to a safety voltage using a power source;
        in response to the high voltage DC bus being charged to the safety voltage, instruct one or more high voltage components to each report a measured voltage reading to the ECU;
        determine whether a fault condition exists based on the respective measured voltage reading received by the ECU; and
        in response to determining that the fault condition does not exist, charge the high voltage DC bus to an operating voltage that is greater than the safety voltage.

2. The system of claim 1, wherein an electric vehicle battery pack is used to charge the high voltage DC bus to the operating voltage.

3. The system of claim 1, wherein determining whether the fault condition exists comprises comparing the respective measured voltage reading to at least one threshold.

4. The system of claim 1, wherein determining whether the fault condition exists comprises comparing the respective measured voltage reading to a voltage range that encompasses the safety voltage.

5. The system of claim 1, wherein the safety voltage is less than 60 volts, and wherein the operating voltage is greater than 60 volts.

6. The system of claim 1, wherein the power source comprises a direct current-to- direct current (DC-to-DC) converter coupled to a battery.

7. The system of claim 6, wherein the battery comprises a 12-volt battery.

8. The system of claim 1, wherein the fault condition comprises an open connector or an open wire condition.

9. The system of claim 1, wherein the safety voltage is 60 volts or less and the operating voltage is 200 volts or greater.

10. A method, comprising:
providing a safety voltage to a high voltage direct current (DC) bus using a power source;
in response providing the safety voltage to the high voltage DC bus, receiving a respective measured voltage reading, via a control area network, from one or more high voltage components electrically connected to the high voltage DC bus;
determining whether a fault condition exists based on the respective measured voltage reading; and
in response to determining that the fault condition does not exist, providing an operating voltage that is greater than the safety voltage to the high voltage DC bus.

11. The method of claim 10, wherein an electric vehicle battery pack is used to provide the operating voltage to the high voltage DC bus.

12. The method of claim 10, wherein determining whether the fault condition exists comprises comparing the respective measured voltage reading to at least one threshold.

13. The method of claim 10, wherein determining whether the fault condition exists comprises comparing the respective measured voltage reading to a voltage range that encompasses the safety voltage.

14. The method of claim 10, wherein the safety voltage is less than 60 volts, and wherein the operating voltage is greater than 60 volts.

15. The method of claim 10, wherein the power source comprises a direct current-to-direct current (DC-to-DC) converter coupled to a battery.

16. The method of claim 15, wherein the battery comprises a 12-volt battery.

17. The method of claim 10, wherein the fault condition comprises an open connector or an open wire condition.

18. The method of claim 10, wherein the safety voltage is 60 volts or less and the operating voltage is 200 volts or greater.

19. A system, comprising:
a first high voltage direct current (DC) bus;
a first virtual high voltage interlock (HVIL), comprising:
    a non-transitory computer-readable medium having instructions recorded thereon that, when executed by a first electronic control unit (ECU), cause the first ECU to:
        charge the first high voltage DC bus to a first safety voltage using a first power source;
        in response to the first high voltage DC bus being charged to the first safety voltage, instruct one or more first high voltage components to each report a first measured voltage reading to the first ECU; and
        determine whether a fault condition exists based on the respective first measured voltage reading received by the first ECU;
a second high voltage DC bus; and
a second virtual HVIL, comprising:
    a non-transitory computer-readable medium having instructions recorded thereon that, when executed by a second ECU, cause the second ECU to:
        charge the second high voltage DC bus to a second safety voltage using a second power source;
        in response to the second high voltage DC bus being charged to the second safety voltage, instruct one or more second high voltage components to each report a second measured voltage reading to the second ECU;
        determine whether a fault condition exists based on the respective second measured voltage readings received by the second ECU; and
        in response to determining that the fault condition does not exist, charge the second high voltage DC bus to an operating voltage that is greater than the second safety voltage.

20. The system of claim 19, wherein the second safety voltage is 60 volts or less and the operating voltage is 200 volts or greater.

* * * * *